Patented July 16, 1946

2,404,297

UNITED STATES PATENT OFFICE 2,404,297

DETERGING, WETTING, AND EMULSIFYING COMPOSITIONS

Harry H. Kroll, Providence, R. I., assignor to Alrose Chemical Company, Cranston, R. I., a corporation of Rhode Island No Drawing. Application June 4, 1943, Serial No. 489,674

13 Claims. (Cl. 252—111)

This invention relates to certain new chemical compositions and a method of combining the constituents of these compositions. The products fall into the general class of detergents consisting of a soap or soaps and adjuvants which promote and facilitate detergency processes. The compositions herein described have also been found useful as emulsifying, foaming, and wetting-out agents.

It has long been recognized that the removal of soil from fabrics, utensils, and the like is a complicated process. It has also been recognized that the process involving the separation of soil from the object to be cleansed is an intricate one involving several stages. In general, the steps involve a wetting-out of the soiled surface, a loosening of the adhering soil from the surface to be cleansed, and the formation of an emulsion in which the loosened soil is the dispersed phase. It is the purpose of the invention to prepare a new and novel composition of matter in which each constituent contributes one or more specific properties to the mixture, and the summation of these properties contributes to the aforesaid composition of matter the characteristics of a good detergent, namely, a rapid wetting-out action, a loosening of the dirt from the soiled surface, and the formation of a stable emulsion of the soil.

The use of soaps as such suffers from two serious limitations—sensitiveness to hardness and to acidity in the water employed. It has been found that the addition of certain chemical substances to the soap results in a composition of matter which possesses excellent detergency in hard waters with a high lime content as well as in solutions ranging from pH 2 to 12.

It has been found that if a small quantity of a soap or soaps, containing from ten to eighteen carbon atoms and in which the cation may be selected from the group of alkali metals, ammonium and substituted ammonia compounds, is incorporated with a neutral emulsifying agent, e. g., N,N-di (hydroxyethyl) lauramide, and a water-soluble organic base such as diethanol amine, and this composition heated for a short period of time at a temperature ranging from 100° C. to 190° C., a product is obtained which exhibits remarkable detergency, wetting-out, emulsifying, and foaming powers. It has also been found that mixing any two of these constituents and omitting the third, and treating these mixtures according to procedures to be described, produces inferior products as compared to that product which contains the three essential constituents, namely, neutral emulsifying agent, soap, and organic base.

It has been found that the thorough admixture of these three constituents by a cold process to form a homogeneous mixture results in a product which is practically devoid of derging power as shown by the inability of a 0.25 per cent aqueous solution of this composition to remove the soil from a standard soiled wool. If this same mixture is submitted to a heat treatment for thirty minutes at 125° C., a product is obtained which shows instant detergency on soiled wool in 0.25 per cent aqueous solutions. No change in the composition of the heat-treated product over the cold mixture could be detected by chemical and physical-chemical analytical methods. This result is unexpected from previous knowledge of the art in that no chemical change is involved and that the new detergent-active product is the result of a physical transformation. These results can be explained best by the modern theories of viscous liquids. The cold mixtures can be considered as liquid dispersions where the addend molecules, i. e., soap and diethanolamine, are randomly dispersed with respect to the initial or solvent molecules, i. e., N,N-di (hydroxyethyl) lauramide. The heat treated product can be considered as a liquid solution in which the solute molecules, i. e., soap and diethanolamine, occupy a definite orientation with respect to the solvent molecules, i. e., N,N-di (hydroxyethyl) lauramide. Hydrogen bonding, van der Waal's forces, secondary valence bonds, etc., are the bonding forces involved in maintaining the preferred molecular orientation in the heat-treated product.

It is to be noted that I do not wish to be bound by the theory involved in interpreting the composition of matter but rather that my invention relates to a composition of matter having the three essential components, a defined neutral emulsifying agent, a water-soluble soap, and a water-soluble organic base, converted by a particular heat treatment to a surface-active detergent with valuable foaming and emulsifying properties.

The neutral emulsifying agents that we have found useful are the fatty acid amide derivatives of the alkylol amines as exemplified by monoethanolamine, diethanolamine, 2 - amino, 2-methyl, 1,3-propanediol, aminoethyl ethanol amine, and 2-hydroxy 1,3-diamino propane. The fatty acids may contain between ten and eighteen carbon atoms and preferably between twelve and fourteen; typical examples of these emulsifying agents are N,N-di (hydroxyethyl) lauramide and the N-hydroxyethyl cocoanut fatty acid amides.

We have also found that the esters prepared from these same fatty acids and the poly alcohols and in which the molar ratio of fatty acid to poly alcohol in the condensate is 1:1 may also be used as the neutral emulsifying adjuvant. Among the compounds of this class which can be incorporated into the mixture are glycol monolaurate, glycerol monopalmitate, sorbitol monolaurate, and the esterification product of coconut fatty acids and the polyethylene glycols formed by the polymerization of ethylene oxide.

The soaps which have been used for making the detergent compositions are the alkali metal, ammonium, and substituted ammonium soaps of lauric, myristic, palmitic, oleic, stearic acids and those acids which are present in naturally occurring vegetable oils such as the cocoanut and palm oils.

Among the water soluble organic bases which we have incorporated into our mixtures are the amino alcohols, oxygen—containing amines, and alkyl amines. The mono-, di- and triethanol amines have been found very useful, but the substituted base such as 2-amino, 2-methyl, 1,3-propanediol, morpholine, N-butyl ethanol amine, N-ethyl diethanolamine, diethylamine, etc., can be used to prepare detergent compositions with the desired properties.

The following examples will further illustrate the nature of this invention but the invention is not restricted to these examples:

Example 1

A mixture composed of:

| | Parts |
|---|---|
| N-hydroxyethyl lauramide | 45.5 |
| N-hydroxyethyl ammonium laurate | 5.4 |
| Monoethanol amine | 14.6 | is heated at 150° for twenty minutes. The cooled mixture is a light tan water-soluble wax which has excellent wetting-out and detergent properties.

Example 2

A mixture composed of:

| | Parts |
|---|---|
| N-hydroxyethyl cocoanut fatty acid amides | 45.5 |
| N,N-di (hydroxyethyl) ammonium laurate | 7.8 |
| Diethanol amine | 30.8 | is heated at 150° C. for twenty minutes. The cooled product is a soft tan wax with useful foaming and washing properties.

Example 3

A mixture composed of:

| | Parts |
|---|---|
| N-hydroxyethyl lauramide | 45.5 |
| Triethanol ammonium laurate | 7.2 |
| Triethanol amine | 36 | is heated for 20 minutes at 150° C. The product is a light tan wax with good emulsifying and wetting-out properties.

Example 4

A mixture composed of:

| | Parts |
|---|---|
| N,N-di (hydroxyethyl) cocoanut fatty acid amide | 133 |
| Diethanol ammonium cocoanut fatty acid soap | 15.6 |
| Diethanol amine | 61.4 | is heated for 45 minutes at 125° C. The product is a clear, amber water soluble oil with excellent washing and foaming properties.

The table compares the properties of the cold mixture as compared with the heat-treated composition.

TABLE

| | Time, min. | Total acid (as soap) per 100 gms. | Index of refraction | pH[1] | W. O. T.[2] | Detergency | |
|---|---|---|---|---|---|---|---|
| | | | | | | ¼% | ⅛% |
| Before heating | 0 | Grams 8.9 | 1.478 | 9.75 | Seconds 34 | None | None |
| After heating | 45 | 8.9 | 1.478 | 9.75 | 10 | Excellent | |

[1] pH measurements were made on 0.25 per cent aqueous solutions at 20° C.
[2] Wetting-out times were measured as the time required by a 0.25 per cent solution to wet-out a 1″ x 1″ square of cotton duck at 45° C.

Example 5

A mixture composed of:

| | Parts |
|---|---|
| N,N-di (hydroxyethyl) cocoanut fatty acid amide | 53.5 |
| Monoethanol ammonium laurate | 5.4 |
| Monoethanol amine | 14.4 | is heated at 140° C. for 25 minutes. The mixture cooled to a soft wax. Aqueous solution displayed good foaming wetting-out and derging properties.

Example 6

A mixture composed of:

| | Parts |
|---|---|
| N,N-di (hydroxyethyl) cocoanut fatty acid amide | 33.2 |
| Sodium palmitate | 4.0 |
| Diethanol amine | 15.4 | is heated at 150° C. for 20 minutes. On cooling, a clear, amber viscous liquid was obtained which exhibited excellent detergency at 0.12 per cent strength and remarkable resistance against precipitation of insoluble soaps by the addition of water with a high lime content.

Example 7

A mixture composed of:

| | Parts |
|---|---|
| N,N-di (hydroxyethyl) cocoanut fatty acid amide | 33.2 |
| Potassium laurate | 6.0 |
| Diethanolamine | 15.4 | is heated at 150° C. for 20 minutes—on cooling results in a clear, light brown liquid. A standard soiled wool when immersed in a 0.25 per cent aqueous solution of this oil at 45° C. was completely cleansed in a few minutes.

Example 8

A mixture composed of:

| | Parts |
|---|---|
| N-lauroyl 2-amino 2-methyl 1,3-dihydroxy propane | 20 |
| Diethanol ammonium laurate | 2.0 |
| Diethanolamine | 15.0 | is heated at 150° C. for 20 minutes. The product was a brown liquid with good surface-active properties.

Example 9

A mixture composed of:

| | Parts |
|---|---|
| Sorbitol laurate | 65.5 |
| Sodium palmitate | 5.5 |
| Amino ethyl ethanol amine | 20.8 | is heated at 150° C. for 25 minutes. The cooled product was a dark red oil which had good deterging properties.

Example 10

A mixture composed of:

| | Parts |
|---|---|
| Sorbitol laurate | 15 |
| Diethanol ammonium laurate | 2 |
| Diethanol amine | 6 | is heated at 160° C. for 15 minutes. A dark red oil with interesting deterging and wetting-out properties was obtained.

Example 11

A mixture composed of the cocoanut fatty acid amide of aminoethyl ethanol amine, and the potassium soaps of cocoanut fatty acids was prepared by heating 105 parts of cocoanut fatty acids, 78 parts of aminoethyl ethanolamine, and 3 milliliters of 50% potassium hydroxide at 170° C. The reaction was judged complete when all the acid had been converted to the amide and the potassium soap. On cooling, the mixture solidified to a yellow wax whose aqueous solutions exhibited good washing and wetting-out properties.

While I have herein disclosed a preferred manner of performing my invention, I do not thereby desire or intend to limit myself solely thereto. The proportions of the materials given therein may be varied if desired without departing from the spirit and scope of the invention as defined in the appended claims and the chemical equivalents of the components recited in the claims shall be accorded.

In the appended claims the term "fatty acid" standing alone and unqualified denotes either the saturated or unsaturated monocarboxylic acids or mixtures which are to be found in the fatty oils and fats (the industrial meaning).

What I claim as new is:

1. A composition of matter having deterging and wetting properties composed of a mixture of a neutral higher fatty acid amide of the alkylol amines, a water-soluble soap containing from 10 to 18 carbon atoms inclusive, in which the cation is a member of the group composed of the alkali metals, ammonium and substituted ammonium bases, and a water-soluble organic nitrogenous base, said mixture having been heat treated for substantially 15–45 minutes in the range substantially 160–125° C.

2. A composition of matter having deterging and wetting properties composed of a mixture of a neutral fatty acid of the alkylol amines whose fatty acid nucleus contains at least 10 carbon atoms, a water-soluble soap containing from 10 to 18 carbon atoms, inclusive, in which the cation is a member of the group composed of the alkali metals, ammonium and substituted ammonium bases, and a water-soluble alkylol amine, said mixture having been heat treated for substantially 15–45 minutes in the range substantially 160–125° C.

3. A composition of matter having deterging and wetting properties composed of a mixture of N, N-dihydroxyethyl fatty acid amide, whose fatty acid nucleus contains at least 10 carbon atoms, a water-soluble soap containing 10 to 18 carbon atoms whose cation is a member of the group consisting of the alkali metals, ammonium and substituted ammonium radicals, and a water-soluble alkylol amine, said mixture having been heat treated for substantially 15–45 minutes in the range substantially 160–125° C.

4. A deterging and wetting-out composition composed of a mixture of N, N-di(hydroxyethyl) cocoanut fatty acid amide, a diethanol ammonium cocoanut fatty acid soap and a diethanol amine, said mixture having been heat treated for substantially 15–45 minutes in the range substantially 160–125° C.

5. A deterging and wetting-out composition consisting of a mixture of N, N-di(hydroxyethyl) lauramide, potassium laurate and diethanolamine, said mixture having been heat treated for substantially 15–45 minutes in the range substantially 160–125° C.

6. A deterging and wetting-out composition composed of a mixture of N, N-di(hydroxyethyl) cocoanut fatty acid amide, monoethanol ammonium cocoanut fatty acid soap and monoethanol amine, said mixture having been heat treated for substantially 15–45 minutes in the range substantially 160–125° C.

7. A deterging and wetting out composition composed of a mixture of a N-hydroxyethyl lauramide, a water-soluble alkali soap of a fatty acid containing from 10 to 18 carbon atoms and an ethanol amine, said mixture having been heat treated for substantially 15–45 minutes in the range substantially 160–125° C.

8. A detergent and wetting-out composition composed of a mixture of N, N-di(hydroxyethyl) cocoanut oil fatty acid amide, sodium palmitate and diethanol amine, said mixture having been heat treated for substantially 15–45 minutes in the range substantially 160–125° C.

9. A wetting out composition composed of a N, N-di(hydroxyethyl) lauramide, diethanol ammonium laurate and diethanol amine, said mixture having been heat treated for substantially 15–45 minutes in the range substantially 160–125° C.

10. A wetting-out and detergent composition composed of a mixture of N, N-di(hydroxyethyl) lauramide, potassium laurate and monoethanol amine, said mixture having been heat treated for substantially 15–45 minutes in the range substantially 160–125° C.

11. A process for preparing a surface active detergent composition comprising mixing a neutral emulsifying agent resulting from the condensation of a fatty acid of at least 10 carbon atoms with an alkylol amine, a water-soluble soap containing from 10 to 18 carbon atoms inclusive and whose cation is selected from a member of the group consisting of the alkali metals, ammonium and substituted ammonium radicals, and a water-soluble organic base, then heating the mixture at a temperature of from substantially 125–160° C. for substantially 45–15 minutes.

12. A process for preparing a surface active detergent comprising heating a mixture of a neutral fatty acid amide of the alkylol amines whose fatty acid nucleus contains at least 10 carbon atoms, a water-soluble soap containing from 10 to 18 carbon atoms inclusive and whose cation is selected from a member of the group consisting of the alkali metals, ammonium and the substituted ammonium radicals, and a water-soluble alkylol amine, for substantially 15-45 minutes in the range substantially 160-125° C.

13. A process for converting a composition of matter to form a surface active composition consisting of mixing N,N-di(hydroxyethyl) cocoanut fatty acid amide, diethanol ammonium cocoanut fatty acid soap and diethanol amine and heating this mixture to a temperature of substantially 150-125° C. from substantially 15 to 25 minutes.

HARRY H. KROLL.